United States Patent [19]

Basini

[11] 4,413,163

[45] Nov. 1, 1983

[54] PORTABLE LINE TESTER FOR TELECOMMUNICATION SYSTEM

[75] Inventor: Bruno Basini, Rome, Italy

[73] Assignee: Selenia, Industrie Elettroniche Associate, S.p.A., Rome, Italy

[21] Appl. No.: 334,066

[22] Filed: Dec. 23, 1981

[30] Foreign Application Priority Data

Jan. 6, 1981 [IT] Italy ................................ 47520 A/81

[51] Int. Cl.³ ............................................. H04B 3/46
[52] U.S. Cl. ....................... 179/175.3 R; 179/175.1 R
[58] Field of Search ................. 179/175.3 R, 175.1 R, 179/175.3 F, 175.11, 175; 324/58.5 A

[56] References Cited

U.S. PATENT DOCUMENTS 4,025,736  5/1977  Chlupsa .................. 179/175.3 F
4,323,738  4/1982  Merrick .................. 179/175.1 R

*Primary Examiner*—Stafford D. Schreyer
*Attorney, Agent, or Firm*—Karl F. Ross

[57] ABSTRACT

A portable instrument for testing the integrity and measuring the attenuation of a subscriber line of a telecommunication system comprises a metering unit joined to a plug by which an associated service telephone can be connected across a line to be tested. The metering unit includes a pilot-tone generator as well as a digital attenuation indicator and is provided with three pushbuttons, two of which disconnect the service telephone from the line on being respectively actuated for transmitting the locally generated pilot tone to the line or feeding an incoming pilot tone to the attenuation indicator. Operation of the third pushbutton connects the local generator to the indicator for calibration purposes. Any of these pushbuttons, when depressed, supplies operating current from a normally open-circuited local battery to all other components of the unit.

10 Claims, 2 Drawing Figures

PORTABLE LINE TESTER FOR TELECOMMUNICATION SYSTEM

FIELD OF THE INVENTION

My present invention relates to a portable metering unit for testing a subscriber line of a telephone or other telecommunication system.

BACKGROUND OF THE INVENTION

A convenient way of probing the integrity and measuring the attenuation of a subscriber line in a telephone system is to transmit a pilot tone preferably in the voice-frequency range, e.g. of 800 Hz, over the line and to detect the amplitude level of that pilot tone at a remote end of the line. Thus, for example, an operator may attach to the line a service telephone and dial a particular call number which connects a pilot-tone generator across the line at the associated central office; a level-measuring device such as a voltmeter, receiving the incoming pilot tone, then allows that operator to check whether a discontinuity or other fault unduly attenuates the signal. For proper testing, however, the following conditions must be satisfied:

(a) the line loop must remain intact for direct current, i.e. the line must be conductively terminated at the testing station by a resistance—e.g. of 150 ohms—corresponding to that normally represented by the subscriber's telephone set during a conversation;

(b) the incoming pilot tone must see a terminating impedance equal to the characteristic line impedance, e.g. of 600 ohms;

(c) the service telephone used for calling in the remote pilot-tone generator must be disconnected during the test without interrupting the line loop for more than a few milliseconds, in order to avoid the transmission of a disconnect signal cutting off that generator.

It should be noted that the term "service telephone", as used herein, could also encompass the subscriber's regular set if it is disconnectable from the line by a plug-and-jack coupling.

Conventional equipment designed to carry out these operations is often cumbersome and heavy; in many instances, its handling requires specially trained personnel.

OBJECTS OF THE INVENTION

The general object of my present invention, therefore, is to provide a portable metering unit which satisfies the aforestated requirements without the drawbacks referred to.

Another important object is to provide a unit of this character which can be used for both the reception of an incoming pilot tone and the emission of a locally generated outgoing pilot tone whereby two such units can be used simultaneously at intercommunicating stations to determine the correct operation of intervening automatic switching and transmitting equipment besides measuring line attenuation.

SUMMARY OF THE INVENTION

A metering unit according to my invention has one input terminal which, during testing, is connected to a first line conductor while two other input terminals thereof are respectively connected to a second line conductor and to one wire of a service telephone whose other wire is connected to the first line conductor. The unit comprises a first and a second switch with contacts serially connected across the two other input terminals referred to for normally completing a calling circuit between the second line conductor and the corresponding telephone wire, thereby enabling the line to be extended to a remote station (either another subscriber or the associated central office) from which a pilot tone can be received. The unit further comprises level-measuring means connectable to the first line conductor via a first capacitor in series with other contacts of the first switch when the latter is actuated, thereby registering the attenuation of an incoming pilot tone, and an oscillator connectable to the first line conductor via a second capacitor in series with other contacts of the second switch for emitting a locally generated pilot tone to the remote station upon actuation of this second switch. In the actuated position of either of these switches, a resistive loop is closed across the line conductors by way of the aforementioned one input terminal via circuit means including an impedance path which extends in shunt with the two capacitors between the corresponding switch contacts.

Advantageously, the unit is also provided with a third switch having contacts connected between an input of the level-measuring means and an output of the local oscillator for establishing a calibrating circuit upon actuation of that switch, the amplitude of the oscillator output being adjustable for the purpose of calibration.

Pursuant to a further feature of my invention, each switch—preferably designed as a pushbutton—also has contacts connecting a local power supply such as a battery to energizing inputs of all active components of the unit when any of these switches is actuated. These active components may also include a generator of reference voltage working into a comparator which also has an input connected to the level-measuring means for signaling an amplitude of an incoming pilot signal lying outside a predetermined range.

BRIEF DESCRIPTION OF THE DRAWING

The above and other features of my invention will now be described in detail with reference to the accompanying drawing in which.

SPECIFIC DESCRIPTION

Figure 1:
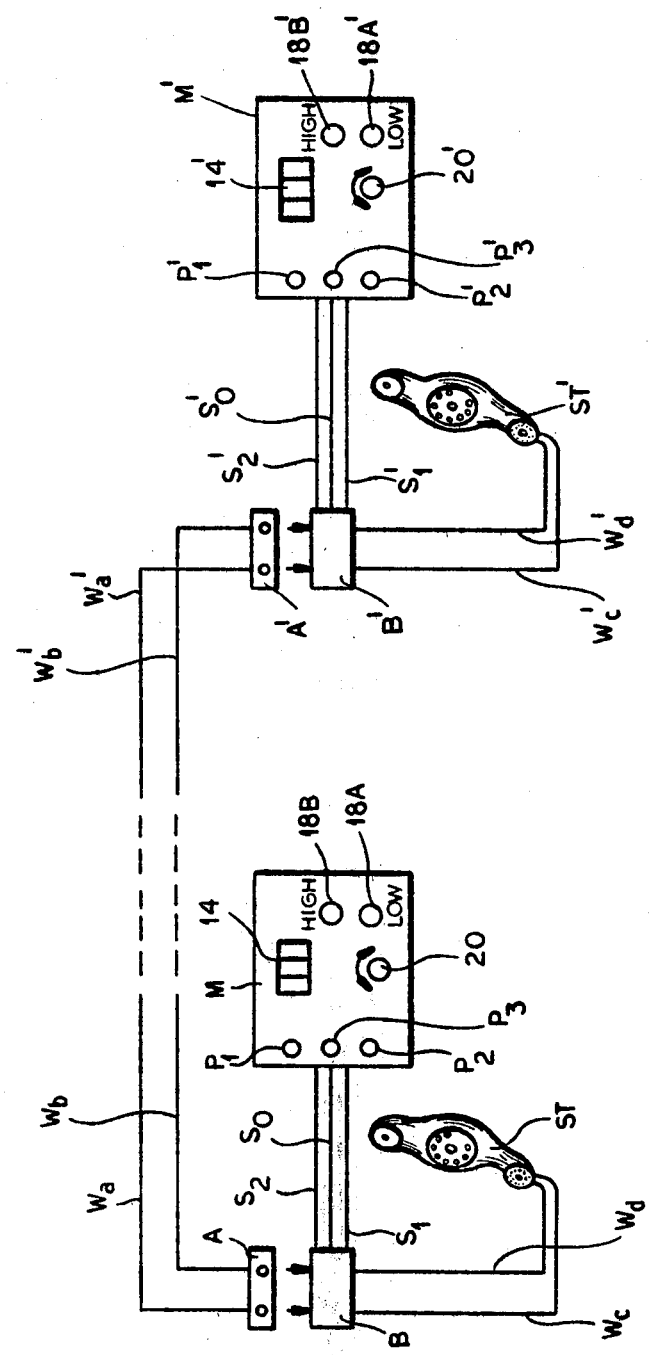
FIG. 1 is an overall diagram showing two metering units according to my invention connected to a pair of intercommunicating subscriber lines.

In FIG. 1 two subscriber lines with respective conductor pairs $W_a$, $W_b$ and $W_a'$, $W_b'$ terminating in jacks A, A' to which service telephones ST, ST' as well as metering units M, M' are connectable via plugs B and B', respectively. Plug B is linked with telephone ST by a pair of wires $W_c$, $W_d$ and with unit M by three leads $S_0$, $S_1$ and $S_2$; corresponding connections for plug B', telephone ST' and unit M' have been designated $W_c'$, $W_d'$ and $S_0'$, $S_1'$, $S_2'$.

The two metering units M and M' are mutually identical and are each provided with three pushbuttons $P_1$, $P_2$, $P_3$ and $P_1'$, $P_2'$, $P_3'$; they also have visual attenuation indicators 14 and 14', alarm lamps 18A, 18B and 18A', 18B' respectively calling attention to an unduly low and an unduly high signal level, and calibrating knobs 20 and 20'.

Figure 2:
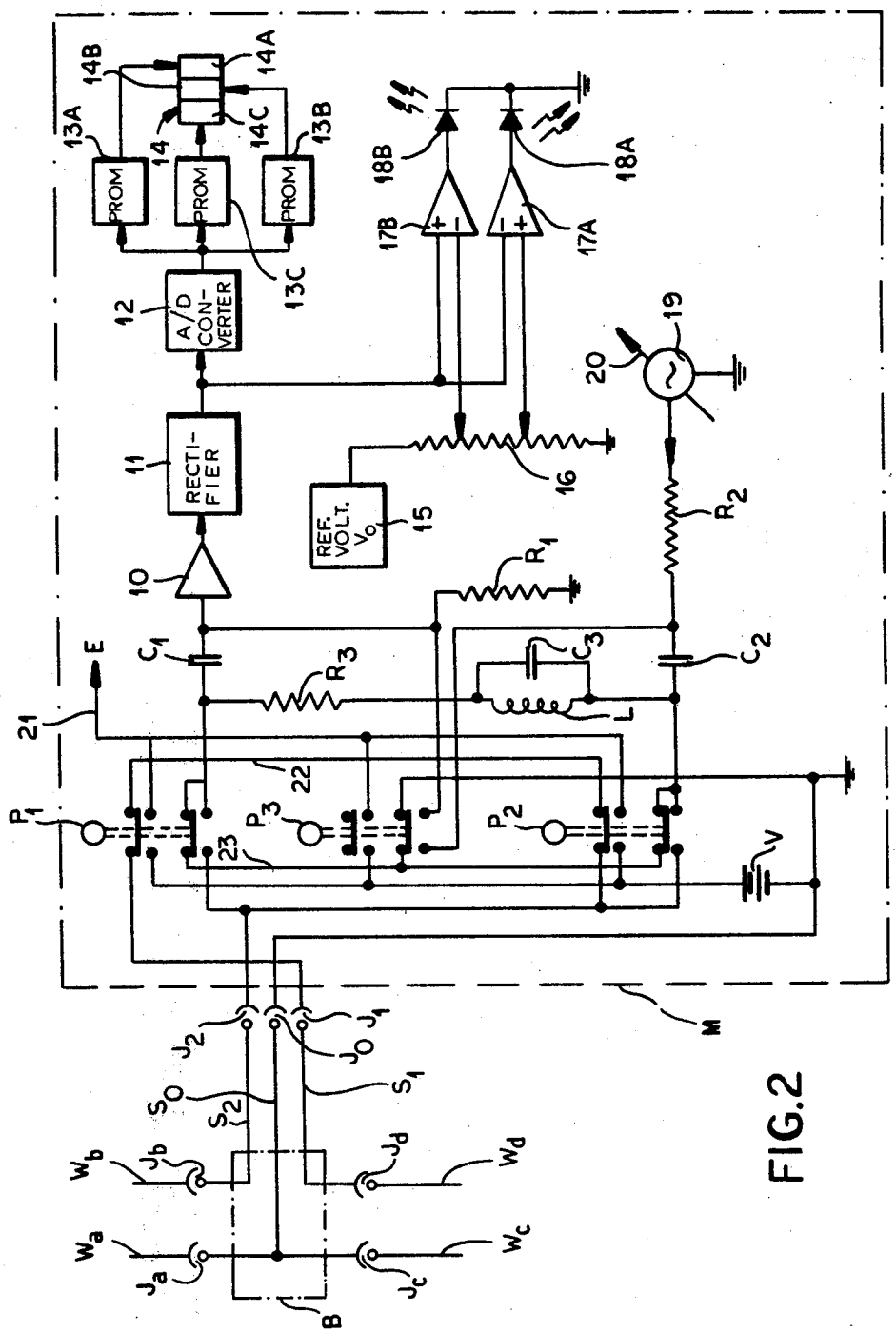
FIG. 2 shows details of a metering unit seen in FIG. 1.

I shall now refer to FIG. 2 for a more detailed description of plug B and measuring unit M which, of course, are also representative of plug B' and unit M' in FIG. 1. The pins and sockets of plug B and jack A have been indicated in FIG. 2 by junctions $J_a$ and $J_b$ releasably connecting line conductors $W_a$ and $W_b$ to leads $S_0$ and $S_2$, respectively; similar junctions $J_c$ and $J_d$ releasably connect leads $S_0$ and $S_1$ to telephone wires $W_c$ and $W_d$, respectively.

Unit M has three input terminals in the form of junctions $J_0$, $J_1$, $J_2$ respectively connected to leads $S_0$, $S_1$ and $S_2$; terminal $J_0$ is grounded and so are, therefore, wires $W_a$ and $W_c$ when all the junctions are engaged.

Each pushbutton switch $P_1$, $P_2$, $P_3$ has an upper and a lower armature coacting with respective pairs of bank contacts in its illustrated normal or unactuated and in its depressed or actuated position. Depression of any pushbutton connects an ungrounded terminal of a battery V, by way of the upper switch armature, to a lead 21 for supplying operating current to energizing inputs—collectively designated E—of all active components described hereinafter. In the normal position of pushbuttons $P_1$ and $P_2$, their upper armatures complete a circuit via a lead 22 between terminals $J_1$ and $J_2$ so as to establish continuity between wires $W_b$ and $W_d$ whereby telephone ST (FIG. 1) is connected across the subscriber line to be tested. One contact pair associated with the lower armature of pushbutton $P_3$ normally grounds a lead 23 connected to corresponding contact pairs of pushbuttons $P_1$ and $P_2$ which in their unactuated positions extend that ground to opposite ends of an impedance path including a resistor $R_3$ in series with an inductor L shunted by a capacitor $C_3$. These ends are also coupled by way of respective capacitors $C_1$ and $C_2$ to an input of an audio-frequency amplifier 10, forming an entrance stage of a level-measuring device, and to an output resistor $R_2$ of an oscillator 19 generating a pilot tone of, say, 800 Hz whose amplitude is adjustable by the knob 20 of FIG. 1 as schematically indicated in FIG. 2. The junction of capacitor $C_1$ with amplifier 10 is grounded through a resistor $R_1$ and is also connected to a bank contact of pushbutton $P_3$, associated with its lower armature, whose mate is connected to the junction of capacitor $C_2$ with resistor $R_2$. Thus, depression of pushbutton $P_3$ connects the output of oscillator 19 via resistor $R_2$ directly to the input of the level-measuring device which further comprises a full-wave rectifier 11 connected between amplifier 10 and an analog/digital converter 12; that converter works into the address inputs of three programmable read-only memories (PROMs) 13A, 13B, 13C which translate the digitized amplitude of an incoming pilot tone, represented by the voltage drop across input resistor $R_1$, into a logarithmic function setting respective decadic stages 14A, 14B, 14C of display 14. These stages, which may be of the liquid-crystal type, visualize respective digits of the measured line attenuation in negative tenths, units and tens of dBm.

Another active component of metering unit M, energized upon the depression of any pushbutton, is a generator 15 of a stabilized reference voltage $V_0$ applied to a grounded potentiometer 16. Two comparators 17A, 17B have first inputs connected to the output of rectifier 11 and second outputs connected to respective taps of potentiometer 16; alarm lamps 18A and 18B, shown as light-emitting diodes, are respectively energized by comparator 17A or 17B when the amplitude of the incoming pilot tone falls short of a lower limit or surpasses an upper limit of a predetermined voltage range. These limits may correspond, for example, to a maximum line attenuation of $-30$ dBm and a minimum line attenuation of $-6$ dBm; they can be adjusted by displacing the corresponding potentiometer taps.

Inductor L and capacitor $C_3$ constitute a parallel-resonant network tuned to the frequency of oscillator 19 so as to block an incoming pilot tone of like frequency. For such a pilot tone, therefore, the line will be effectively terminated by the resistor $R_1$ whose magnitude, e.g. of 600 ohms, matches the characteristic line impedance and also equals the magnitude of resistor $R_2$ in the output of oscillator 19. The relatively large capacitors $C_1$ and $C_2$ serve only to block the direct line current and have a negligible impedance at the pilot frequency; their capacitance may have a value of 40 $\mu$F, for example. The magnitude of resistor $R_3$, on the other hand, may be about 150 ohms and should equal the resistance of the subscriber's telephone set (which could be the same as service telephone ST) in the closed state of its hook switch.

In a calibration step, which is desirable before the locally generated pilot tone is sent to the remote metering unit M' (FIG. 1), the operator depressed the pushbutton $P_3$ to energize components 10–19 and to connect resistor $R_2$ in series with amplifier 10 so as to simulate the arrival of a pilot tone over the characteristic line impedance. On observing the reading of display 14, the operator now adjusts the output amplitude of the oscillator with the aid of knob 20 until that reading has a predetermined value, e.g. of $-6$ dBm. Such calibration can, of course, also be performed when the instrument is disconnected from the line.

Depression of pushbutton $P_1$ opens the line loop through telephone ST, previously closed for dialing the remote station (or the central office) from which a pilot tone is to be received, but instantly recloses it for direct current via resistor $R_3$, inductor L and the lower armatures of pushbuttons $P_2$ and $P_3$. The incoming pilot tone traverses the capacitor $C_1$ and the resistor $R_1$, giving rise to an attenuation reading on display 14. If a line attenuation of up to 12 dB is considered acceptable, the maximum absolute value of that reading—in light of the aforedescribed calibration of the remote oscillator—should be 18 dBm. Excessive deviations from the acceptable values would light the LED 18A or 18B as discussed above.

If the metering unit M is to act as a transmitter of the pilot tone for unit M', the operator depresses pushbutton $P_2$ which again opens the line loop and instantly recloses it via impedance path L, $R_3$ and the lower armatures of the other two pushbuttons. Oscillator 19 is now coupled to the line by way of resistor $R_2$ in series with capacitor $C_2$, telephone ST being open-circuited as in the previous instance.

When pushbuttons $P_1$, $P_2$ of unit M and pushbuttons $P_1'$, $P_2'$ are released, the operators at the two stations can converse with each other to coordinate their actions.

I claim:

1. A portable metering unit for testing a subscriber line of a telecommunication system while having one input terminal connected to a first line conductor and two other input terminals respectively connected to a second line conductor and to one wire of a service telephone also having another wire joined to said one line conductor, comprising:

a first and a second switch having contacts serially connected across said two other input terminals for normally completing a calling circuit between said second line conductor and said one wire of said service telephone enabling extension of said line to a remote station;

level-measuring means connectable to said second line conductor via a first capacitor in series with other contacts of said first switch in an actuated position of the latter for registering the attenuation of an incoming pilot tone generated at the remote station;

an oscillator connectable to said second line conductor via a second capacitor in series with other contacts of said second switch in an actuated position of the latter for emitting a locally generated pilot tone to the remote station; and circuit means including an impedance path extending ahead of said capacitors between said other contacts of said first and second switches for closing a resistive loop across said line conductors by way of said one input terminal in the actuated position of either of said switches.

2. A metering unit as defined in claim 1, further comprising a third switch with contacts connected between an input of said level-measuring means and an output of said oscillator for establishing a calibrating circuit upon actuation of said third switch, said oscillator being of adjustable amplitude.

3. A metering unit as defined in claim 2 wherein said one input terminal is grounded, said third switch having other contacts normally grounding both ends of said impedance path in the unactuated state of said first and second switches.

4. A metering unit as defined in claim 1, 2 or 3 wherein each of said switches has further contacts connecting, in the actuated position thereof, a local power supply to energizing inputs of all active components of the unit including said level-measuring means and said oscillator.

5. A metering unit as defined in claim 4 wherein said active components further include a generator of reference voltage and comparison means with inputs connected to said generator and to said level-measuring means for signaling an amplitude of an incoming pilot signal outside a predetermined range.

6. A metering unit as defined in claim 1, 2 or 3 wherein said switches are pushbuttons.

7. A metering unit as defined in claim 1, 2 or 3 wherein said level-measuring means is connected across a relatively high-ohmic first resistor inserted between said first capacitor and said one input terminal, said oscillator being connected to said second capacitor via a relatively high-ohmic resistor having substantially the same magnitude as said first resistor, said impedance path including a relatively low-ohmic third resistor.

8. A metering unit as defined in claim 7 wherein said impedance path further includes a parallel-resonant circuit tuned to the operating frequency of said oscillator for blocking said pilot tone.

9. A metering unit as defined in claim 1, 2 or 3 wherein said level-measuring means comprises a pilot-tone amplifier followed by a rectifier and memory means connected to said rectifier by way of an analog/digital converter for translating a digitized value of an analog amplitude of an incoming pilot tone into a numerical value of line attenuation displayed on a visual indicator.

10. A metering unit as defined in claim 9 wherein said memory means comprises several read-only memories with address inputs connected in parallel to said converter, said indicator having a plurality of decadic stages with setting inputs respectively connected to reading outputs of said memories.

* * * * *